United States Patent [19]

Adrianus de Mooy

[11] Patent Number: 4,651,877

[45] Date of Patent: Mar. 24, 1987

[54] PACKING FOR A CONSUMER ARTICLE

[75] Inventor: Cornelis Adrianus de Mooy, Rotterdam, Netherlands

[73] Assignee: 501 Van Nelle Lassie B.V., Rotterdam, Netherlands

[21] Appl. No.: 777,704

[22] Filed: Sep. 19, 1985

[30] Foreign Application Priority Data

Oct. 3, 1984 [NL] Netherlands ........................ 8403013

[51] Int. Cl.[4] ........................ B65D 73/00; A23B 4/04

[52] U.S. Cl. .................................... 206/459; 206/525; 219/490; 426/84; 235/375; 364/477

[58] Field of Search ......................... 219/10.55 B, 490; 426/84; 235/375; 364/477

[56] References Cited

U.S. PATENT DOCUMENTS 4,339,646 7/1982 Doi et al. ..................... 219/10.55 B 4,375,586 3/1983 Veda ............................ 219/10.55 B 4,386,109 5/1983 Bonen et al. ................. 219/10.55 E

*Primary Examiner*—Joseph Man-Fu Moy

*Attorney, Agent, or Firm*—John P. Snyder

[57] ABSTRACT

The invention relates to a situation in which a merchant puts at a client's disposal an apparatus (9) for processing consumer articles (1) that are sold by him. The operation of the apparatus (9) is made dependent on the purchase of the consumer article (1) in question by making an element (4) releasing the operation of the apparatus (9) to form part of the packing (2) so as to make operation of the apparatus (9) only possible with the unlocking element (4).

The unlocking element can take the form of a cardboard card (4) on which a magnetic strip (5) containing a code is applied. The apparatus may be a coffee making apparatus (9) comprising a device for reading the magnetic code of the card (4), releasing the coffee making process and for extinguishing the code.

5 Claims, 4 Drawing Figures

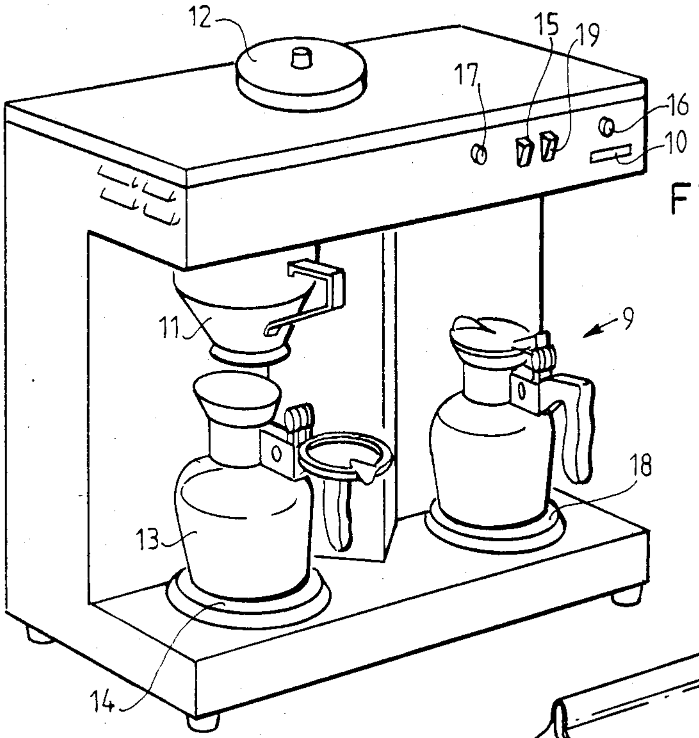
FIG. 4
FIG. 1
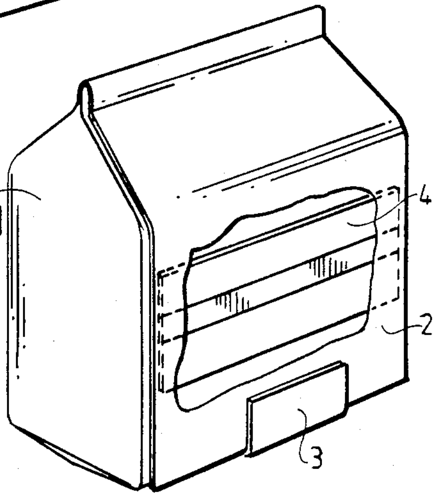
FIG. 2
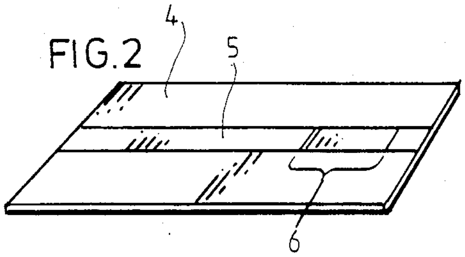
FIG. 3
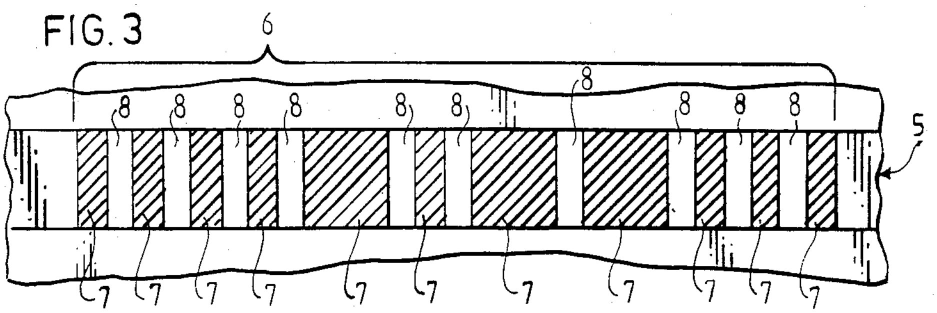

PACKING FOR A CONSUMER ARTICLE

The invention relates to a packing of a consumer article and in particular to a packing of an article to be processed in an apparatus.

The invention relates to a situation in which a merchant puts at the client's disposal an apparatus for processing consumer articles that are sold by him.

The aim of the invention is to provide means to make the operation of the apparatus dependent on the purchase of the consumer article in question.

The aim is reached by an element releasing the processing of the apparatus forming part of the packing. The operation of the apparatus is only possible with the unlocking element enclosed with that specific packing.

The invention will now be described on the basis of an embodiment according to the accompanying drawing. In the drawing the figures show:

FIG. 1: a perspective view of the packing according to the invention, in which part of the packing is broken away;

FIG. 2: a perspective view of an unlocking element according to the invention;

FIG. 3: a schematic illustration of a code of an unlocking element according to the invention; and FIG. 4: a perspective view of the coffee making apparatus according to the invention.

The packing shown in FIG. 1 consists of a bag 1 containing coffee, of which the flap 2 has been folded down and adhered to the underside of the bag by a piece of adhesive paper 3. Between the flap 2 of the bag and the part of the bag in which the coffee is contained, a cardboard card 4 with a magnetic strip 5 has been inserted, which card can be seen by the broken away part of the flap 2.

In FIG. 2 the cardboard card 4 on which a magnetic strip 5 has been applied is shown. The part 6 of the magnetic strip 5 contains a magnetic code, in the shape of alternate magnetized areas.

The part 6 of the magnetic strip 5 containing the code is shown enlarged in FIG. 3. Here, the areas 7 magnetized towards the south pole and the areas 8 magnetized towards the north pole, which are shown shaded are clearly visible.

The width of the strip is 4,7 mm, the length of the part containing the code is 14 mm and the pitch of the magnetized areas is 0,5 mm.

In FIG. 4 a coffee making apparatus 9 is depicted. The coffee making apparatus comprises an aperture 10, through which the magnetic card 4 can be inserted. Behind the aperture a read-and-extinguish device is placed. The coffee making apparatus further comprises elements which are known per se and which will therefore not be described here.

To put the coffee making apparatus into operation, the filter cup 11 of the coffee making apparatus has—after the application of a filter—to be filled with the amount of ground coffee which has been delivered in one packing according to the invention. The water reservoir (not shown) has to be filled with water after removal of the lid 12 through the orifice which is then released. Subsequently an empty coffee pot 13 has to be placed on a warming hob 14 which is provided on the left hand side of the apparatus, and this warming hob has to be switched on by means of a switch which is placed on the front of the coffee making apparatus. Then the coffee making process is started by inserting the magnetic card 4 belonging to the packing into the aperture 10 which is intended therefore.

The card 4 is then read by a card-read-and-extinguish device (not shown) which is provided behind the aperture 10 wherein by a comparison circuit which is not depicted either, the code read by the card reader is compared with a code which has been inserted into the comparison circuit. When both codes correspond with each other the card is being extinguished by the card-read-and-extinguish device and is ejected through the aperture 10, while the comparison circuit switches on the heating element of the coffee making apparatus through which the coffee brewing process starts. When the codes do not correspond with each other, the magnetic card is ejected without switching on the heating element. Over the aperture 10 a control lamp 16 is provided which lights when said codes correspond with each other. On the right hand side of the switch 15 a control lamp 17 is provided, which lights during the coffee making process. After the termination of the coffee making process the coffee pot 13 is positioned onto a warming hob 18 on the right hand side which can be switched on by switch 19 which is provided on the right hand side of switch 15, so that a further coffee making process can be initiated.

What is claimed is:

1. A new article of manufacture which comprises a package containing a predetermined quantity of material from which a food product may be prepared and including a member bearing erasable encoded processing data for controlling the processing steps of an apparatus which produces the food product from the predetermined quantity of material.

2. A new article of manufacture as defined in claim 1 wherein the encoded processing data on said member is erased by the apparatus which produces the food product.

3. A new article of manufacture as defined in claim 2 wherein said material is tea or coffee.

4. A system for producing a food product of desired quality, which comprises the combination of:

- a package containing a predetermined amount of material which may be processed to produce said food product, the package including a member bearing erasable encoded processing data instructing a specific series of processing steps to produce the food product of desired quality from said predetermined amount of material; and
- apparatus means for receiving the amount of material contained in the package, reading the encoded processing data on the member, erasing the encoded processing data on the member, and performing said specific series of processing steps upon the received material to produce the food product of desired quality, whereby each member is usable only once and may not be reused to produce a food product which may be of inferior quality.

5. A system as defined in claim 4 wherein said material is tea or coffee.

* * * * *